United States Patent
Yu et al.

(10) Patent No.: US 11,295,751 B2
(45) Date of Patent: Apr. 5, 2022

(54) MULTI-BAND SYNCHRONIZED NEURAL VOCODER

(71) Applicant: TENCENT AMERICA LLC, Palo Alto, CA (US)

(72) Inventors: Chengzhu Yu, Bellevue, WA (US); Meng Yu, Bellevue, WA (US); Heng Lu, Sammamish, WA (US); Dong Yu, Bothell, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 272 days.

(21) Appl. No.: 16/576,943

(22) Filed: Sep. 20, 2019

(65) Prior Publication Data

US 2021/0090584 A1 Mar. 25, 2021

(51) Int. Cl.
*G10L 19/00* (2013.01)
*G10L 19/16* (2013.01)
*G06N 3/02* (2006.01)

(52) U.S. Cl.
CPC .......... *G10L 19/16* (2013.01); *G06N 3/02* (2013.01)

(58) Field of Classification Search
CPC ... G10L 13/00; G10L 13/02; G10L 2013/021; G10L 13/047; G10L 13/04; G10L 15/00; G10L 15/083; G10L 15/16; G10L 15/20; G10L 19/00; G10L 19/0017; G10L 2019/0011; G10L 2019/0012; G10L 2019/0016; G10L 19/0018; G10L 19/008; G10L 19/02; G10L 19/0204; G10L 19/0208; G10L 19/04; G10L 19/06; G10L 19/07; G10L 19/08; G10L 19/087; G10L 19/093; G10L 19/097; G10L 19/12; G10L 19/125; G10L 19/13; G10L 19/16; G10L 19/167; G10L 19/173; G10L 19/18; G10L 19/20; G10L 19/22; G10L 19/24; G10L 19/26; G10L 19/265; G06N 3/02; G06N 3/04; G06N 3/0454; G06N 3/08
See application file for complete search history.

(56) References Cited

U.S. PATENT DOCUMENTS

| | | | | |
|---|---|---|---|---|
| 5,425,130 | A * | 6/1995 | Morgan | G10L 21/00 704/202 |
| 5,715,365 | A * | 2/1998 | Griffin | G10L 19/087 704/214 |
| 5,809,455 | A * | 9/1998 | Nishiguchi | G10L 25/93 704/211 |

(Continued)

OTHER PUBLICATIONS

Oord, A. V. D., Dieleman, S., Zen, H., Simonyan, K., Vinyals, O., Graves, A., . . . & Kavukcuoglu, K. (2016). Wavenet: A generative model for raw audio. arXiv preprint arXiv: 1609.03499. (Year: 2016).*

(Continued)

*Primary Examiner* — Edgar X Guerra-Erazo
(74) *Attorney, Agent, or Firm* — Sughrue Mion, PLLC

(57) ABSTRACT

An apparatus and a method include receiving an input audio signal to be processed by a multi-band synchronized neural vocoder. The input audio signal is separated into a plurality of frequency bands. A plurality of audio signals corresponding to the plurality of frequency bands is obtained. Each of the audio signals is downsampled, and processed by the multi-band synchronized neural vocoder. An audio output signal is generated.

11 Claims, 5 Drawing Sheets

(56) References Cited

U.S. PATENT DOCUMENTS

| | | | | |
|---|---|---|---|---|
| 6,041,297 | A * | 3/2000 | Goldberg | G10L 19/12 704/219 |
| 6,233,550 | B1 * | 5/2001 | Gersho | G10L 19/10 704/208 |
| 6,475,245 | B2 * | 11/2002 | Gersho | G10L 19/10 704/208 |
| 8,078,474 | B2 | 12/2011 | Vos et al. | |
| 8,566,259 | B2 * | 10/2013 | Chong | G06N 20/00 706/12 |
| 9,124,981 | B2 * | 9/2015 | Grokop | H04M 1/72454 |
| 10,529,349 | B2 * | 1/2020 | Le Roux | G06N 3/08 |
| 2001/0023396 | A1 * | 9/2001 | Gersho | G10L 19/18 704/220 |
| 2011/0066578 | A1 * | 3/2011 | Chong | G06N 20/00 706/12 |
| 2014/0133663 | A1 * | 5/2014 | Grokop | G10L 17/00 381/56 |
| 2014/0195227 | A1 | 7/2014 | Rudzicz et al. | |
| 2014/0201126 | A1 | 7/2014 | Zadeh et al. | |
| 2019/0066657 | A1 | 2/2019 | Okamoto et al. | |
| 2019/0122651 | A1 | 4/2019 | Arik et al. | |
| 2019/0318754 | A1 * | 10/2019 | Le Roux | G10L 19/06 |

OTHER PUBLICATIONS (Lorenzo-Trueba, J., Drugman, T., Latorre, J., Merritt, T., Putrycz, B., Barra-Chicote, R., . . . & Aggarwal, V. (2018). Towards achieving robust universal neural vocoding. arXivpreprintarXiv: 1811.06292) (Year: 2018).*

Ling, Z. H., Ai, Y., Gu, Y., & Dai, L. R. (2018). Waveform modeling and generation using hierarchical recurrent neural networks for speech bandwidth extension. IEEE/ACM Transactions on Audio, Speech, and Language Processing, 26(5), 883-894. (Year: 2018).*

Liu, L. J., Ling, Z. H., Jiang, Y., Zhou, M., & Dai, L. R. (Sep. 2018). WaveNet Vocoder with Limited Training Data for Voice Conversion. In Interspeech (pp. 1983-1987). (Year: 2018).*

Mehri, S., Kumar, K., Gulrajani, I., Kumar, R., Jain, S., Sotelo, J., . . . & Bengio, Y. (2016). SampleRNN: An unconditional end-to-end neural audio generation model. arXiv preprint arXiv:1612. 07837. (Year: 2016).*

Okamoto, T., Tachibana, K., Toda, T., Shiga, Y., & Kawai, H. (Apr. 2018). An investigation of subband WaveNet vocoder covering entire audible frequency range with limited acoustic features. In 2018 IEEE International Conference on Acoustics, Speech and Signal Processing (ICASSP) (pp. 5654-5658). (Year: 2018).*

Kalchbrenner, N., Elsen, E., Simonyan, K., Noury, S., Casagrande, N., Lockhart, E., . . . & Kavukcuoglu, K. (Jul. 2018). Efficient neural audio synthesis. In International Conference on Machine Learning (pp. 2410-2419). PMLR. (Year: 2018).*

Valin, J. M., & Skoglund, J. (May 2019). LPCNet: Improving neural speech synthesis through linear prediction. In ICASSP 2019-2019 IEEE International Conference on Acoustics, Speech and Signal Processing (ICASSP) (pp. 5891-5895). IEEE. (Year: 2019).*

International Search Report in International Application No. PCT/US2020/045911, dated Oct. 22, 2020.

Written Opinion in International Application No. PCT/US2020/045911, dated Oct. 22, 2020.

Arik et al. "Deep Voice: Real-time Neural Text-to-Speech," arXiv:1702. 07825v2 (cs. CL) Mar. 7, 2017, [retrieved on Oct. 11, 2020], Retrieved from the Internet: <URL:https://arxiv.org/pdf/1702. 07825 pdf> pp. 1-17, (17 Pages Total).

* cited by examiner

MULTI-BAND SYNCHRONIZED NEURAL VOCODER

BACKGROUND

Wavenet was the first neural vocoder, and was provided by Google. To improve the inference speed of Wavenet, a Parallel Wavenet was later provided by Google. While Parallel Wavenet significantly outperformed the speed of the original Wavenet, Parallel Wavenet required a large number of graphic processing units (GPUs) (or a large number of central processing units (CPUs)) in inference time to perform parallel computation which is extremely computationally expensive and has limited application in real production systems. Later, a WaveRNN model was provided, and significantly reduced the inference time. However, the inference time is still significantly slow.

SUMMARY

According to some possible implementations, a method performed by a multi-band synchronized neural vocoder comprises receiving an input audio signal to be processed by the multi-band synchronized neural vocoder; separating, by the multi-band synchronized neural vocoder, the input audio signal into a plurality of frequency bands; obtaining, by the multi-band synchronized neural vocoder, a plurality of audio signals that corresponds to the plurality of frequency bands, based on separating the input audio signal into the plurality of frequency bands; downsampling, by the multi-band synchronized neural vocoder, each of the plurality of audio signals, based on obtaining the plurality of audio signals; processing, by the multi-band synchronized neural vocoder, the downsampled audio signals; and generating, by the multi-band synchronized neural vocoder, an audio output signal based on processing the downsampled audio signals.

According to some possible implementations, a multi-band synchronized neural vocoder device comprises at least one memory configured to store program code; and at least one processor configured to read the program code and operate as instructed by the program code, the program code including: receiving code configured to cause that least one processor to receive an input audio signal to be processed by the multi-band synchronized neural vocoder; separating code configured to cause the at least one processor to separate the input audio signal into a plurality of frequency bands; obtaining code configured to cause the at least one processor to obtain a plurality of audio signals that corresponds to the plurality of frequency bands, based on separating the input audio signal into the plurality of frequency bands; downsampling code configured to cause the at least one processor to downsample each of the plurality of audio signals, based on obtaining the plurality of audio signals; processing code configured to cause the at least one processor to process the downsampled audio signals; and generating code configured to cause the at least one processor to generate an audio output signal based on processing the downsampled audio signals.

According to some possible implementations, a non-transitory computer-readable medium stores instructions, the instructions comprising: one or more instructions that, when executed by one or more processors of a device, cause the one or more processors to: receive an input audio signal to be processed by the multi-band synchronized neural vocoder device; separate the input audio signal into a plurality of frequency bands; obtain a plurality of audio signals that corresponds to the plurality of frequency bands, based on separating the input audio signal into the plurality of frequency bands; downsample each of the plurality of audio signals, based on obtaining the plurality of audio signals; process the downsampled audio signals; and generate an audio output signal based on processing the downsampled audio signals.

DETAILED DESCRIPTION

Recently, neural vocoders such as Wavenet, WaveRNN and LPCNet generate raw audio samples on a frame by frame basis, and are capable of achieving highly natural speech that significantly surpasses conventional vocoders based on estimating the acoustic features.

However, the major challenge of applying neural vocoders on real production systems is based on their inference speed. Most neural vocoders are designed to predict every audio sample in an auto-regressive manner and even one second of speech/audio has tens of thousands of samples that might need to be inferenced, which significantly inhibits the inference speed. Extensive engineering effort has been applied to improve the efficiency of neural vocoders, but the inference speed is still not fast enough in many production systems.

In the present disclosure, a multi-band synchronized neural vocoder is provided which separates audio into multiple bands (e.g., n bands), and down-samples signals in each band by m times. The neural vocoder is configured to predict samples from each band simultaneously utilizing a single CPU. As signals in each band are down-sampled by m times, the inference samples are also reduced by m times, therefore the present disclosure provides a significant speed increase in inference time. Accordingly, some implementations herein improve speech/audio generation speed of neural vocoders such as WaveNet, WaveRNN, and LPC-Net.

According to an embodiment, the present disclosure provides fast, efficient, and high quality audio generation. The proposed multi-band audio generation system can speed up the audio/speech generation speed of neural vocoders by up to 4 to 6 times without sacrificing generated audio quality.

Figure 1A:
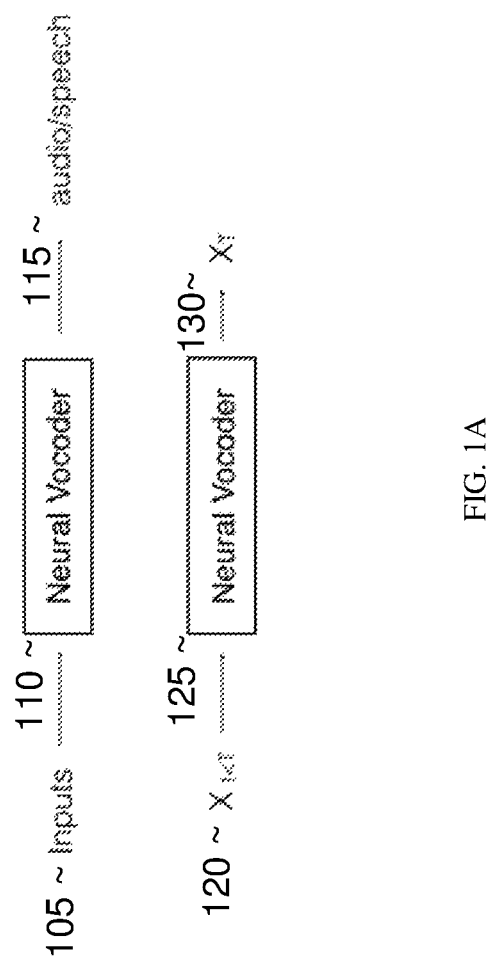
FIGS. 1A and 1B are diagrams of an overview of an example implementation described herein.
Figure 1B:
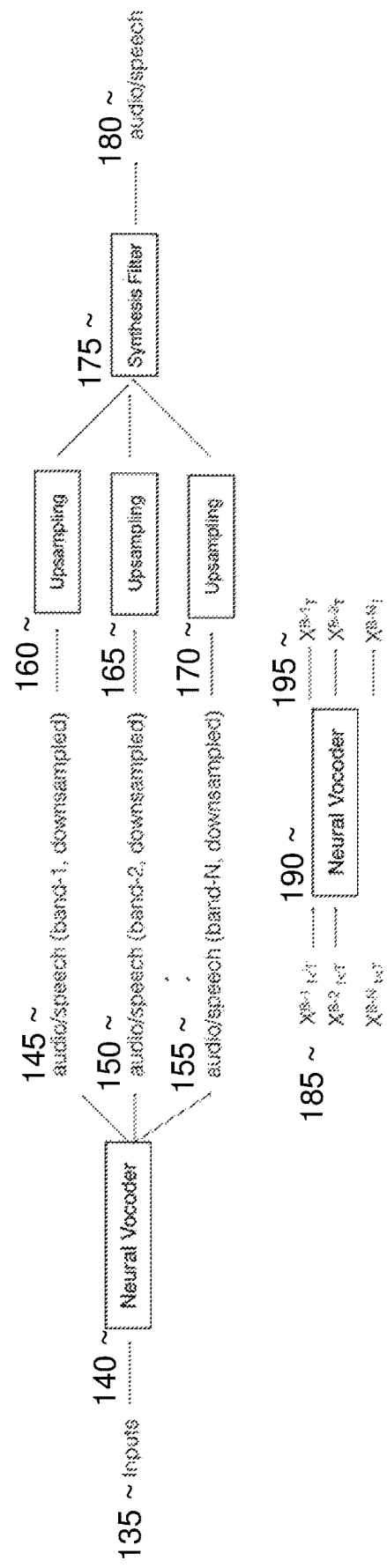

FIGS. 1A and 1B are diagrams of an overview of an embodiment described herein. As shown in FIGS. 1A and 1B, the neural vocoder is an autoregressive model that predicts each sample of target audio recursively given the history of predicted samples.

As shown in FIG. 1A, an audio signal input 105 is provided to a neural vocoder 110. The neural vocoder 110 generates an audio/speech waveform 115 based on the audio signal input 105. As further shown in FIG. 1A, an input 120 is provided at a time (t) that is less than a time (T) into the neural vocoder 125. The neural vocoder 125 generates an output, and provides the output 130 at the time (T).

In the multi-band synchronized approach of the present disclosure, an audio signal is separated into multiple equally separated frequency bands. Further, signals in each frequency band are trained to be predicted as a separate stream. Moreover, the signals in each frequency band can be downsampled by n times without the loss of information based on the Nyquist theorem.

Therefore, the number of samples in each frequency band is n times less than the original audio signal. Further, an embodiment predicts samples in all n frequency bands simultaneously, therefore reducing the complete inference step by n times. Further, most layers of the neural vocoder are used for predicting samples in all frequency bands, except for the final fully connected layers as well as the softmax layers where each frequency bands has its own fully connected layer and corresponding softmax layer.

By sharing most of the weight parameters across all frequency bands, the computation of single step inference of multi-band neural vocoder is only slightly higher than that of a conventional neural vocoder, but the total inference steps are n times smaller. Therefore, the present disclosure provides a multi-band neural vocoder that is significantly faster.

The proposed multi-band audio generation system can speed up the audio/speech generation speed of neural vocoders by up to 4-6 times without sacrificing generated audio quality.

For example, as shown in FIG. 1B, inputs 135 are provided to the neural vocoder 140. The neural vocoder 145 separates the inputs 135 into a set of signals 145, 150, and 155 of different frequency bands. Further, the neural vocoder 145 downsamples each signal 145, 150, and 155.

As further shown in FIG. 1B, the neural vocoder 140 may upsample each signal using a set of upsamling filters 160, 165, and 170. Further still, the neural vocoder 140 may synthesize the separated signals using a synthesis filter 175. Last, the neural vocoder 140 may generate an audio output 180.

As further shown in FIG. 1B, the neural vocoder 190 (which corresponds to the neural vocoder 140 described above) receives a set of input signals 185 at a time (t) that is less than a time (T). Further, the neural vocoder 190 generates a set of outputs 195, and provides the outputs 195 at a time (T). In this way, the neural vocoder 190 synchronously and simultaneously processes multiple input signals, thereby reducing the inference time, increasing throughput, etc.

Figure 2:
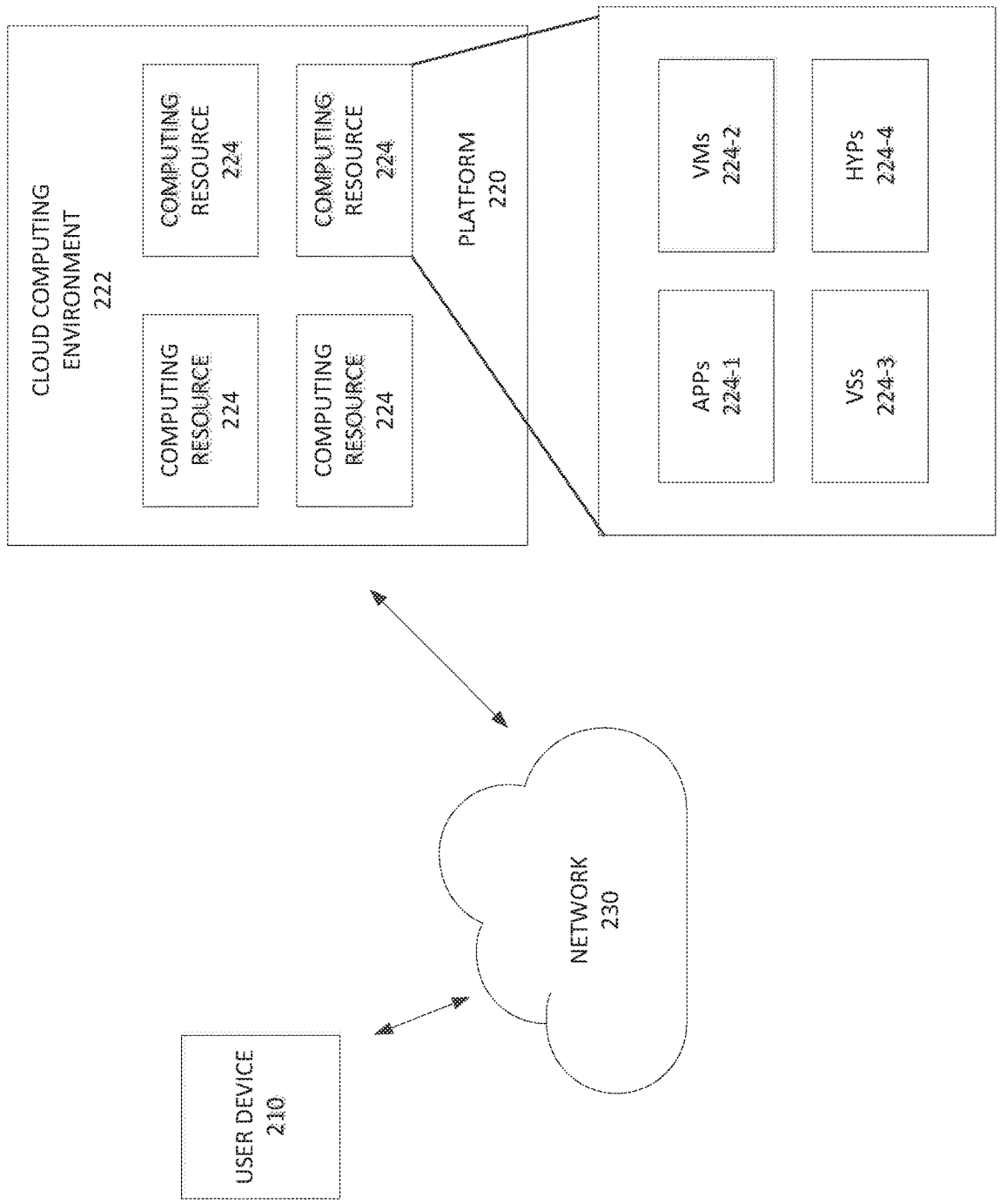
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a platform 220, and a network 230. Devices of environment 200 may interconnect via wired connections, wireless connections, or a combination of wired and wireless connections.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of generating an audio output signal by a multi-band synchronized neural vocoder, as described elsewhere herein. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 is not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210 and/or sensor device 220. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
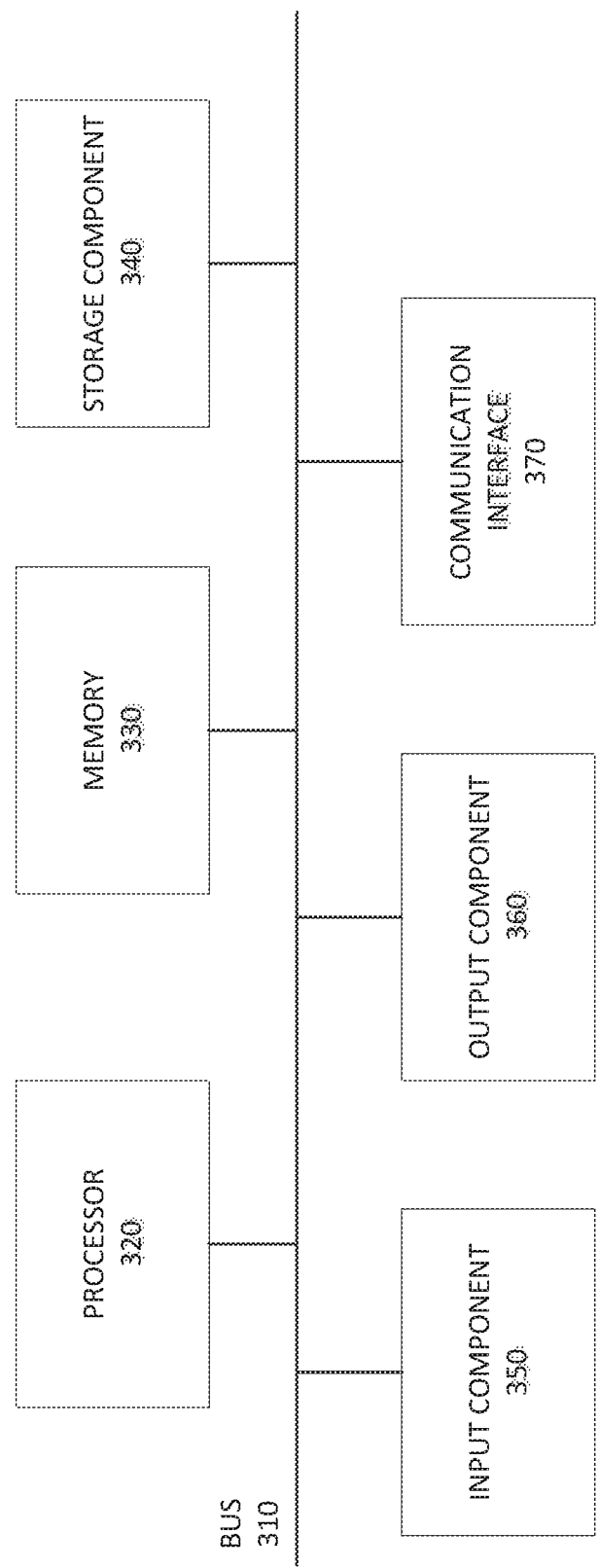
FIG. 3 is a diagram of example components of one or more devices of FIG. 2.

FIG. 3 is a diagram of example components of a device 300. Device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
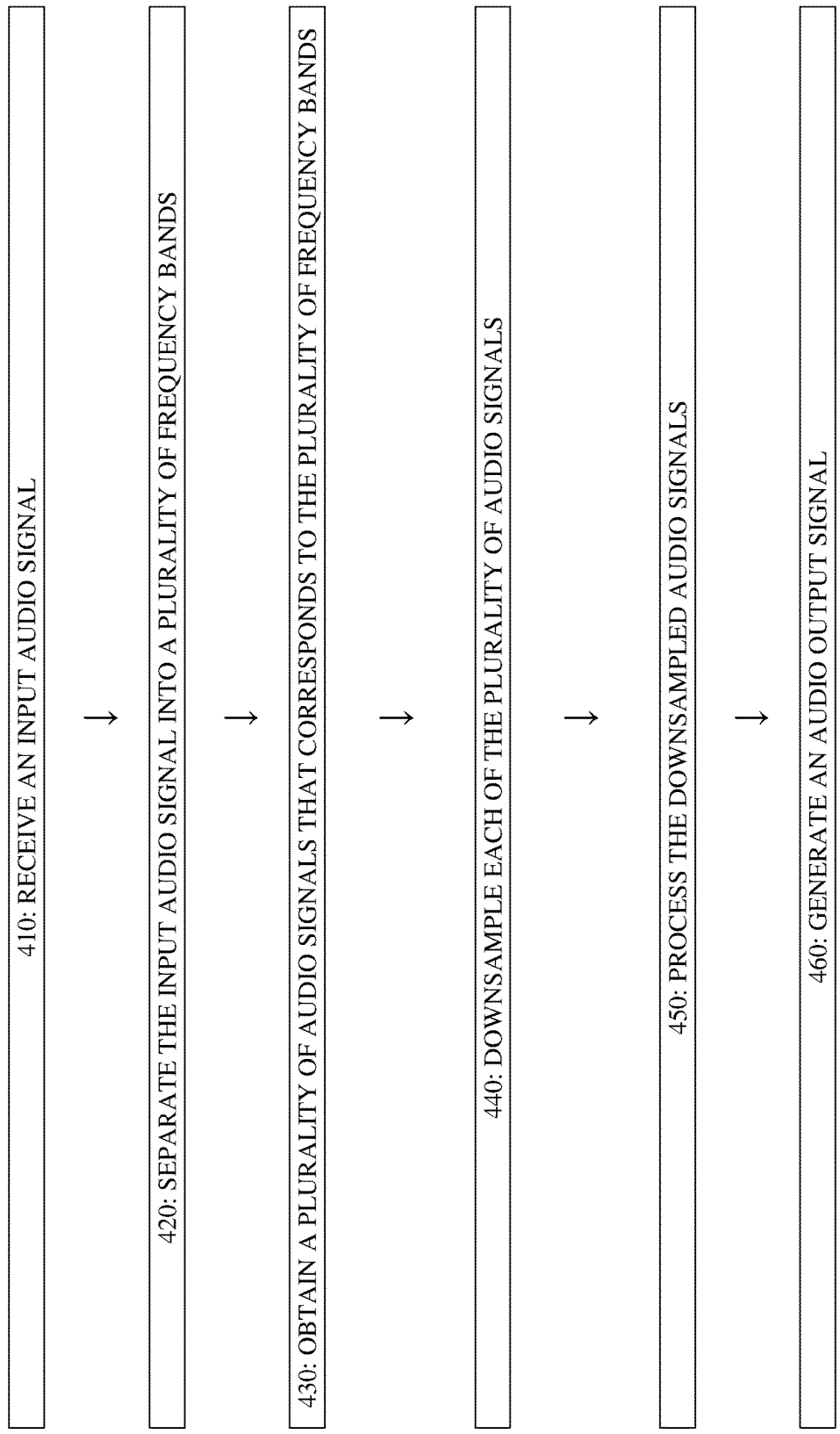
FIG. 4 is a flow chart of an example process for generating an audio output signal by a multi-band synchronized neural vocoder.

FIG. 4 is a flow chart of an example process 400 for generating an audio output signal by a multi-band synchronized neural vocoder. In some implementations, one or more process blocks of FIG. 4 may be performed by platform 220. In some implementations, one or more process blocks of FIG. 4 may be performed by another device or a group of devices separate from or including platform 220, such as user device 210.

As shown in FIG. 4, process 400 may include receiving an input audio signal to be processed by the multi-band synchronized neural vocoder (block 410).

As further shown in FIG. 4, process 400 may include separating, by the multi-band synchronized neural vocoder, the input audio signal into a plurality of frequency bands (block 420).

As further shown in FIG. 4, process 400 may include obtaining, by the multi-band synchronized neural vocoder, a plurality of audio signals that corresponds to the plurality of frequency bands, based on separating the input audio signal into the plurality of frequency bands (block 430).

As further shown in FIG. 4, process 400 may include downsampling, by the multi-band synchronized neural vocoder, each of the plurality of audio signals, based on obtaining the plurality of audio signals (block 440).

As further shown in FIG. 4, process 400 may include processing, by the multi-band synchronized neural vocoder, the downsampled audio signals (block 450).

As further shown in FIG. 4, process 400 may include generating, by the multi-band synchronized neural vocoder, an audio output signal based on processing the downsampled audio signals (block 460).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method performed by a multi-band synchronized neural vocoder, comprising:
   receiving an input audio signal to be processed by the multi-band synchronized neural vocoder;
   separating, by the multi-band synchronized neural vocoder, the input audio signal into a plurality of frequency bands;
   obtaining, by the multi-band synchronized neural vocoder, a plurality of audio signals that corresponds to the plurality of frequency bands, based on separating the input audio signal into the plurality of frequency bands;
   downsampling, by the multi-band synchronized neural vocoder, each of the plurality of audio signals, based on obtaining the plurality of audio signals;
   processing, by the multi-band synchronized neural vocoder, the downsampled audio signals; and
   generating, by the multi-band synchronized neural vocoder, an audio output signal based on processing the downsampled audio signals,
   wherein the neural vocoder is an LPCNet vocoder.

2. The method of claim 1, wherein the downsampled audio signals of each of the plurality of frequency bands are processed simultaneously.

3. The method of claim 1, wherein the downsampled audio signals of each of the plurality of frequency bands are processed using a single processing unit.

4. The method of claim 1, further comprising:
   upsampling each of the processed audio signals; and
   generating the audio output signal based on upsampling each of the processed audio signals.

5. A multi-band synchronized neural vocoder device, comprising:
   at least one memory configured to store program code;
   at least one processor configured to read the program code and operate as instructed by the program code, the program code including:
      receiving code configured to cause that least one processor to receive an input audio signal to be processed by the multi-band synchronized neural vocoder device;
      separating code configured to cause the at least one processor to separate the input audio signal into a plurality of frequency bands;
      obtaining code configured to cause the at least one processor to obtain a plurality of audio signals that corresponds to the plurality of frequency bands, based on separating the input audio signal into the plurality of frequency bands;
      downsampling code configured to cause the at least one processor to downsample each of the plurality of audio signals, based on obtaining the plurality of audio signals;
      processing code configured to cause the at least one processor to process the downsampled audio signals; and
      generating code configured to cause the at least one processor to generate an audio output signal based on processing the downsampled audio signals, wherein the neural vocoder device is an LPCNet vocoder.

6. The device of claim 5, wherein the downsampled audio signals of each of the plurality of frequency bands are processed simultaneously.

7. The device of claim 5, wherein the downsampled audio signals of each of the plurality of frequency bands are processed using a single processing unit.

8. The device of claim 5, wherein the program code further comprises:
   upsampling code configured to cause the at least one processor to upsample each of the processed audio signals; and
   wherein the generating code is further configured to cause the at least one processor to generate the audio output signal based on upsampling each of the processed audio signals.

9. A non-transitory computer-readable medium storing instructions, the instructions comprising: one or more instructions that, when executed by one or more processors of a multi-band synchronized neural vocoder device, cause the one or more processors to:
   receive an input audio signal to be processed by the multi-band synchronized neural vocoder device;
   separate the input audio signal into a plurality of frequency bands;
   obtain a plurality of audio signals that corresponds to the plurality of frequency bands, based on separating the input audio signal into the plurality of frequency bands;
   downsample each of the plurality of audio signals, based on obtaining the plurality of audio signals;
   process the downsampled audio signals; and
   generate an audio output signal based on processing the downsampled audio signals,
   wherein the neural vocoder device is an LPCNet vocoder.

10. The non-transitory computer-readable medium of claim 9, wherein the downsampled audio signals of each of the plurality of frequency bands are processed simultaneously.

11. The non-transitory computer-readable medium of claim 9, wherein the downsampled audio signals of each of the plurality of frequency bands are processed using a single processing unit.

* * * * *